United States Patent
Ogale

(10) Patent No.: US 6,419,871 B1
(45) Date of Patent: Jul. 16, 2002

(54) PLASMA TREATMENT OF FILTER MEDIA

(75) Inventor: Kumar Ogale, Vineland, NJ (US)

(73) Assignee: Transweb, LLC., Vineland, NJ (US)

( * ) Notice: Subject to any disclaimer, the term of this patent is extended or adjusted under 35 U.S.C. 154(b) by 0 days.

(21) Appl. No.: 09/577,824

(22) Filed: May 25, 2000

(51) Int. Cl.$^7$ ............................................. B29C 59/14
(52) U.S. Cl. ........................... 264/423; 55/524; 55/528; 55/DIG. 5; 55/DIG. 39; 95/59; 96/66; 96/69; 96/98; 264/455; 264/466; 264/469; 264/483; 264/DIG. 8; 264/DIG. 48; 442/92
(58) Field of Search ................................. 96/15, 69, 66, 96/98, 99; 55/524, 528, DIG. 5, DIG. 39; 95/59; 264/340, 423, 455, 466, 469, 483, DIG. 8, DIG. 48; 442/92

(56) References Cited

U.S. PATENT DOCUMENTS

| 4,588,537 A | 5/1986 | Klaase et al. ........ 264/DIG. 48 |
| 5,073,175 A | 12/1991 | Anand et al. ............. 55/DIG. 5 |
| 5,209,850 A | 5/1993 | Abayasekara et al. .... 264/DIG. 48 |
| 5,282,965 A | 2/1994 | Urairi et al. ......... 264/DIG. 48 |
| 5,411,576 A | 5/1995 | Jones et al. ..................... 95/57 |
| 5,437,900 A | 8/1995 | Kuzowski ................. 55/528 X |
| 5,472,481 A | 12/1995 | Jones et al. ..................... 96/15 |
| 5,597,645 A | 1/1997 | Pike et al. ....................... 96/99 |
| 5,645,627 A | 7/1997 | Lifshutz et al. ................. 96/15 |
| 5,830,810 A * | 11/1998 | Cohen ...................... 55/528 X |
| 5,908,598 A * | 6/1999 | Rousseau et al. ........ 264/340 X |

FOREIGN PATENT DOCUMENTS

| JP | 1-232038 | * 9/1989 | .................... 96/69 |
| WO | WO 0001737 | 1/2000 | |

OTHER PUBLICATIONS

Strobel et al, "Plasma Fluorination of Polyolefins", *Journal of Polymer Science*, vol. 25, pp. 1295–1307, 1987.*

* cited by examiner

*Primary Examiner*—Richard L. Chiesa
(74) *Attorney, Agent, or Firm*—Birch, Stewart, Kolasch & Birch, LLP.

(57) ABSTRACT

The present invention is drawn to an improved electrostatic filter medium comprising a web of electret fibers which have been treated with fluorine-containing plasmas at a deposition amount of about 0.03 g/m$^2$ to about 1.5 g/m$^2$; electrostatically charged; rinsed; and dried. The present invention is further drawn to a method of producing non-woven webs which have been treated with a fluorine-containing plasma at a deposition amount of about 0.03 g/m$^2$ to about 1.5 g/m$^2$; electrostatically charged; rinsed; and dried.

8 Claims, No Drawings

PLASMA TREATMENT OF FILTER MEDIA

BACKGROUND OF THE INVENTION

1. Field of the Invention

The present invention relates to the improvement of electrostatic filter media by the use of a fluorine-containing plasma.

2. Description of the Related Arts

Filters having an electrostatic charge are known in the art and have a variety of uses. The electrostatic charge provides for increased filter efficiency against a variety of substances, especially charged particulates such as dust. Charged filters are commonly used today in household heating and air conditioning filters and in vacuum bags.

The filters typically contain a non-woven web of electret fibers. These webs can be formed by a variety methods. For example, a thin film or monolayer of polymer material can be extruded and charged via corona discharge. The charged film is then fibrillated and the resulting fibrils formed into a non-woven web via needle punching or other known means. In another method, a polymer is melt blown as a fine fiber and then fashioned into a non-woven web. The fibers are charged either as they exit the orifice of the extruder during melt blowing or after they are assembled into a web. Charging can be carried out by corona exposure, ion bombardment, etc.

The conventional electrostatic filters, however, suffer from unstable charging. The electrostatic charge possessed by the fiber electrets tends to dissipate over time. This presents a problem with respect to storage stability. The consumer may be confronted with fluctuating filtering efficiency based on the duration between manufacture and use.

Furthermore, the charge loss may be accelerated during use, thereby requiring a premature change of the filter. This accelerated charge loss during use is normally caused by the make up of the composition being filtered. One known problem in this regard is the presence of oily aerosols. It is known that oil is especially problematic with respect to a polyolefin based filter web such as polypropylene.

One proposal for dealing with this problem is set forth in U.S. Pat. No. 5,411,576. Here, oily aerosol resistance is stated to be improved by incorporating a fluorochemical additive into a polypropylene fiber electret. The fluorochemical is blended with the polypropylene before extrusion and is taught to be used in an amount of 0.2 to 10% by weight. The fluorochemical must be melt processable and preferably has a molecular weight in the range of about 500 to 2500.

SUMMARY OF THE INVENTION

It is an object of the present invention to provide a filter having improved electrostatic charge stability.

It is another object of the invention to provide a filter having good resistance against oils.

A further of object of the invention is to provide a washable electrostatic media.

Another object of the present invention is to provide a process for making electrets having improved charge stability.

A further object of the present invention is to provide a process for making a filter having improved properties.

These and other objects of the invention are achieved by a filter medium, comprising a web of electret fibers, said fibers having been formed from a material that was treated with a fluorine-containing plasma at a deposition amount of about 0.03 g/m$^2$ to about 1.5 g/m$^2$; electrostatically charged; rinsed; and dried.

DETAILED DESCRIPTION OF THE INVENTION

The present inventor has unexpectedly discovered that treating the web material with a fluorine-containing plasma to create a deposition of about 0.03 g/m$^2$ to about 1.5 g/m$^2$ of a fluoropolymer, followed by washing and drying, increases the charge stability of the electret. In addition, the filter efficiency is also improved.

The plasma treatment can be carried out at virtually any stage of the filter manufacturing process, so long as it occurs prior to the charging step. Preferably, in the melt blown fabrication process, the plasma treatment is carried out after web formation, although plasma treatment could occur at any time after the fibers leave the orifice of the melt blow extruder. Correspondingly, the charging of the fibers is preferably carried out on the non-woven web after the plasma treatment.

Similarly, in the fibrillating based fabrication process, the plasma treatment can occur at any time once the material leaves the orifice of the extruder; i.e., simultaneously with extrusion, so long as the plasma treatment occurs before the charging step. However, for convenience, the plasma treatment is preferably carried out on the thin film and prior to fibrillation. Plasma treatment after fibrillation is also contemplated, as is plasma treatment after web formation. Charging can occur at any stage of web formation after the plasma treatment has been carried out, including after needle punching or other binding step.

The plasma treatment uses a fluorine-containing plasma. This means that the plasma contains a fluorine source such that a fluorine free radical or ion is formed. The fluorine source can be elemental fluorine or a fluorine-containing compound. Examples of suitable fluorine sources include short chain fluorocarbons having 1 to 8 carbon atoms, preferably 1–3 carbon atoms, wherein at least one hydrogen atom has been replaced with a fluorine atom. Preferably, at least 25 mol % of the hydrogen atoms have been replaced with fluorine atoms, more preferably at least 50%. The fluorocarbons can be saturated or unsaturated. Other fluorine sources include fluorosilanes. Concrete examples of fluorine sources include fluorine, trifluoromethane, tetrafluoroethane, and tetrafluorosilane (SiF$_4$).

The plasma is typically comprised of the fluorine source, only, although other materials can be present. In one embodiment, the fluorine source is mixed with a carrier gas such as nitrogen, which may cause higher fluorine radical generation in the plasma.

Suitable plasma conditions to ensure deposition of about 0.03 g/m$^2$ to about 1.5 g/m$^2$, preferably about 0.05 g/m$^2$ to 1.0 g/m$^2$, more preferably about 0.07 g/m$^2$, of a fluoropolymer can be readily determined by conventional means. The power, duration, and pressure can vary significantly depending on the size and shape of the chamber and the composition of the plasma. In general the power ranges from 10 to 5000 watts, the duration of the treatment is from one second to five minutes and the process pressure is from 10 milliTorr to 1000 milliTorr. Subsequent to plasma treatment the filter is washed an aqueous solvent mixture, such as an isopropyl alcohol/water mixture, or water and dried.

The treated material, in film, fiber, or web form, is electrically charged in order to form an electret. This charging generally is carried out by corona discharge although any of the methods known in the art for charging such materials can be used.

The fiber material used in the filter of the resent invention can be any of the known materials, including polycarbonates, polyhalocarbons, polyesters, nylons and polyolefins. Of these, polyolefins such as polyethylene and polypropylene, are preferred with polypropylene being most preferred.

The web formed can be woven or non-woven. Typically, the web is non-woven and formed from fibers that resulted from either fibrillating a thin film of polymer material or from melt blowing the fibers directly. Meltblown webs may be formed using standard meltblown technology as described in U.S. Pat. No. 2,411,660; U.S. Pat. No. 3,849,241; U.S. Pat. No. 4,215,682; U.S. Pat. No. 2,466,906; U.S. Pat. No. 2,491,889; U.S. Pat. No. 2,740,184; U.S. Pat. No. 2,810,426; U.S. Pat. No. 3,003,304; and Wente, V.A. Tech Rep. No. PB111437, Naval Rsch. Lab., NRL-4364, Apr. 15, 1954. Fibrillated webs may be formed according to the standard technology as described in U.S. Pat. No. 3,998,916 and U.S. Pat. No. 4,456,648. The size of the fibers is not particularly limited in the present invention as all of the known and customary sizes and shapes may be employed herein.

The web can be used by itself as a filter or it can be combined with other layers. For example, the web can be laminated with a scrim or netting, a woven layer such as fabric, or with a non-woven layer. Of course, multiple webs and multiple layers are also contemplated.

EXAMPLE 1

Meltblown media made of 40 gm/m$^2$ polypropylene was treated with a hexafluoropropylene gas plasma having the following characteristics:

| | |
|---|---|
| Power: | 3000 W |
| Plasma type: | RF |
| Line speed: | 3 meter/min. |
| Gas level: | 3 L/min. |
| Deposition rate: | 0.25 gm/m$^2$ |

After plasma treatment the media was rinsed in water and the efficiency of the media was tested as follows.

The efficiency of the filter media was tested using a challenge aerosol of KCl. The aerosol was generated using a nebulizer and then neutralized. Using a laser particle counter the number of particles between 0.03 $\mu$m and 0.5 $\mu$m in size were measured before and after the filter. The ratio of the number of particles before the filter to the number of particles after the filter is the efficiency of the filter. The washed filter had the following properties, measured as described above.

| | |
|---|---|
| Efficiency: | 87% (0.3–5 $\mu$m particle size) |
| Pressure drop: | 12.5 mm H$_2$O |
| Test Flow rate: | 30 CFM |
| Test aerosol: | KCl |
| Filter size: | 10 cm × 10 cm × 0.5 cm, 5 pleats/inch |

The filter was then loaded with 2 gm of SAE fine dust to simulate an in use application. The filter was rinsed with water and the efficiency tested again at the above conditions, upon which it showed the following properties.

| | |
|---|---|
| Efficiency: | 87.8% |
| Pressure Drop: | 12.5 mm H$_2$O |

EXAMPLE 2

A meltblown polypropylene web was plasma treated at the above-described conditions but with a deposition of 0.05 gm/m$^2$ (Type 1); 0.025 gm/m$^2$ (Type 2); no plasma treatment (Type 3). Each of the webs were corona charged at 15 kV. The webs had a base weight of 50 gm/m$^2$. The efficiency of the webs was tested before and after washing with water. ("% Penetration"=100−% efficiency) Washed webs were dried at 40° C. Efficiency was tested using a polydisperse NaCl aerosol, 10 cm/sec face velocity and is inverse of the percentage of penetration.

TABLE 1

| sample type | Type 1 | Type 2 | Type 3 |
|---|---|---|---|
| | | Percent penetration | |
| before wash | 10.25 | 22.6 | 40.0 |
| after wash, 40° dry | 1.2 | 40.6 | 41.0 |

As shown in Table 1, web of the present invention has synergistically improved properties.

EXAMPLE 3

A meltblown polypropylene web with a base weight of 15 gm/m$^2$ was plasma treated with a deposition rate of 0.25g/m$^2$ and corona charged at 15 kV. The media was tested before and after washing. The washed webs were dried at 40° C. The webs had the following properties before and after washing.

Before wash: 90% penetration(particle size 0.3–0.5 $\mu$m)

After wash: 73% penetration

The pressure drop before and after the rinse step was same.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method of forming a non-woven web, which comprises:

(1) melt blowing polyolefin fibers into a non-woven web;

(2) treating said non-woven web with a fluorine-containing plasma at a deposition amount of about 0.03 g/m$^2$ to about 1.5 g/m$^2$;

(3) charging said treated non-woven web to form a non-woven web of electret fibers;

(4) rinsing said treated and charged non-woven web; and (5) drying said non-woven web.

2. The method according to claim 1, wherein said polyolefin fibers are made of polypropylene.

3. The method according to claim 1, wherein said plasma contains a trifluoromethane, tetrafluoroethane, or tetrafluorosilane.

4. The method of claim 1, wherein the treatment with a fluorine-containing plasma is at a deposition amount of about 0.07 g/m$^2$.

5. A method of forming a non-woven web, which comprises:
   (1) treating a thin film of polymer with a fluorine-containing plasma at a deposition amount of about 0.03 g/m$^2$ to about 1.5 g/m$^2$;
   (2) electrically charging said treated thin film;
   (3) rinsing said treated and charged thin film;
   (4) drying said thin film;
   (5) fibrillating said charged film to form fibers; and
   (6) forming said fibers into a non-woven web of electret fibers.

6. The method according to claim 5, wherein said polymer is polypropylene.

7. The method according to claim 5, wherein said plasma contains a trifluoromethane, tetrafluoroethane, or tetrafluorosilane.

8. The method of claim 5, wherein the treatment with a fluorine-containing plasma is at a deposition amount of about 0.07 g/m$^2$.

\* \* \* \* \*